United States Patent
Chaitanya et al.

(10) Patent No.: US 7,512,754 B1
(45) Date of Patent: Mar. 31, 2009

(54) SYSTEM AND METHOD FOR OPTIMIZING STORAGE UTILIZATION

(75) Inventors: Shiva Chaitanya, State College, PA (US); Karan Gupta, San Jose, CA (US); Madhukar R. Korupolu, Sunnyvale, CA (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/023,988

(22) Filed: Jan. 31, 2008

(51) Int. Cl.
*G06F 12/00* (2006.01)
*G06F 13/00* (2006.01)
*G06F 13/28* (2006.01)

(52) U.S. Cl. .................. 711/158; 711/156; 711/154; 711/170

(58) Field of Classification Search .................. None
See application file for complete search history.

(56) References Cited

U.S. PATENT DOCUMENTS

| | | | |
|---|---|---|---|
| 7,139,875 | B2 | 11/2006 | Nagata |
| 2005/0071560 | A1 | 3/2005 | Bolik |
| 2007/0113036 | A1 | 5/2007 | Gal-Oz |
| 2007/0180087 | A1 | 8/2007 | Mizote et al. |
| 2007/0195700 | A1 | 8/2007 | Katoh et al. |
| 2007/0230471 | A1 | 10/2007 | Ikeda et al. |

*Primary Examiner*—Reginald G Bragdon
*Assistant Examiner*—Eric S Cardwell
(74) *Attorney, Agent, or Firm*—MaxValueIP, LLC

(57) ABSTRACT

In a storage area network, the storage pool is the principal component that determines the storage quality of service in the network. The proposed system's goal is to balance the utilizations of the storage pools using a suitable metric (e.g., standard deviation). The utilization of a storage pool is determined by the same components that are part of the composition of the storage pool: the disks and the storage systems. This system then gathers performance information about all the storage pools and applies the described method to determine a sequence of resource-reallocations so that a well-balanced utilization of pools is achieved.

1 Claim, 5 Drawing Sheets

SYSTEM AND METHOD FOR OPTIMIZING STORAGE UTILIZATION

BACKGROUND OF THE INVENTION

The promise of storage area networks was to separate storage from application servers and to develop storage as a first-class entity that would provide services to applications. Today's storage networks are very complex with thousands of application servers, tens of thousands of storage volumes and a few hundred thousand data paths between the servers and the storage volumes. It is thus not easy for one or even several human administrators take decisions about complex storage area networks using manual tools, neither is it practical to assume the decisions will achieve storage quality of service (QoS) guarantees for an extended period of time.

Several existing approaches have tackled the problem of satisfying application QoS requirements in large-scale storage systems. Dynamic tuning of resource allocations to meet the QoS requirements has been proposed before. Another uses a proportional sharing scheduling algorithm to admit requests from various applications to the storage subsystem. In addition, it uses a feedback control to adjust the disk queue length. Triage adopts an adaptive controller that can automatically adjust the system model based on input-output observations.

The proposed technique is independent of the QoS requirements of the applications and addresses automation of the mechanism to achieve long-term storage quality of service for the application servers in the storage area network, while minimizing the human component in the decision making and uses the aggregate component utilization as the balancing metric for dynamic data migration.

SUMMARY OF THE INVENTION

The approach in an embodiment presented here for optimizing storage systems is different from traditional approaches to quality of service maintenance by observing application service times. This approach is unique in that it maintains storage quality of service by ensuring well-balanced and low utilizations in all internal components of a storage system. The approach starts by sorting all the storage pools based on the utilization and selects a storage pool from the list which its utilization is over a predetermined threshold. This is tagged as "Source" and all other storage pools are tagged as targets. "Source" storage volumes are then sorted based on a suitable performance metric such as I/O rate and "k" highest rank volumes with the potential of reducing the utilization is selected as "reallocation plan".

This "reallocation plan" is then exercised on all the target storage pools and the ratio of utilization reduction standard deviation to reallocation cost is calculated. This list would be the list which reflects the reduction of the utilization weighted by the cost of the reallocation, which again sorted based on this ratio. At this point, the target with the highest ratio from this list is selected and the ratio examined against a second threshold. This is a threshold which could justify the reallocation. If the ratio is below this threshold algorithm ends. If the ratio is above this threshold, this allocation plan and the target is added to the master reallocation plan list, utilization is recalculated for all the storage pools considering this reallocation plan and the algorithm is repeated.

DETAILED DESCRIPTION OF THE PREFERRED EMBODIMENTS

Figure 1:
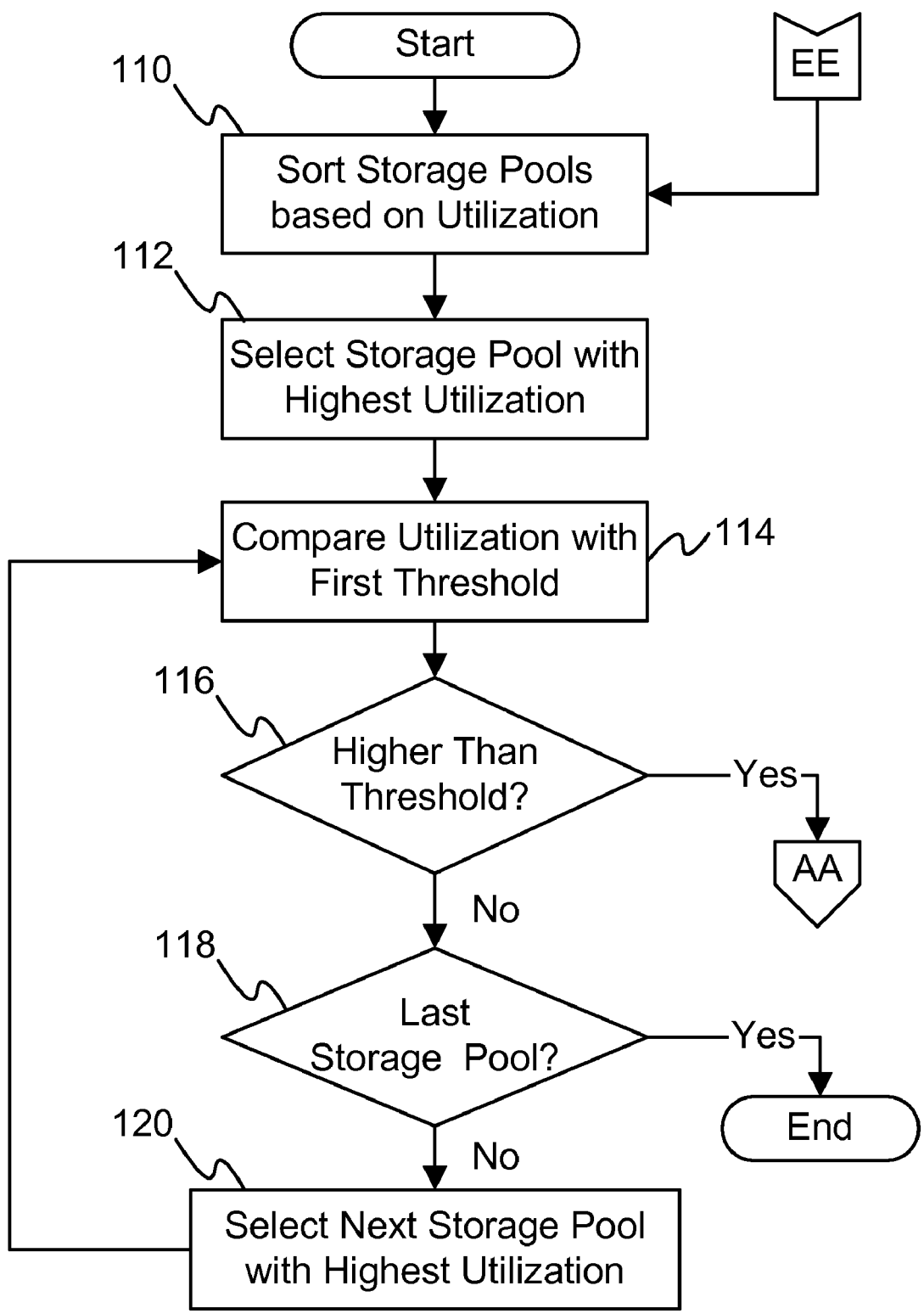
FIG. 1 is the flow diagram for selection of the "Source" storage pool.

An embodiment of the invention teaches a system and a method for optimizing a storage area network by rebalancing the utilization of internal components in this storage area network, where the storage area network is comprised of multiple storage controllers and multiple storage pools. A method of an embodiment is comprised of:

Each controller among the multiple storage controllers controlling one storage pool among the multiple storage pools; where each storage pool among the multiple storage pools comprising multiple storage volumes. This method starts by determining a utilization value for each storage pool among the multiple storage pools, then ordering every storage pool among the multiple storage pools, based on its corresponding utilization value; selecting a storage pool with the highest utilization value; assigning the storage pool with the highest utilization value as a source storage pool, if the highest utilization value is larger than a first threshold.

Assigning all storage pools except the source storage pool as target storage pool; calculating a first standard deviation corresponding to all utilization values for these all storage pools; using a metric, ranking all storage volumes within the source storage pool; where the metric comprising an input-output rate; listing the ranked storage volumes within the source storage pool in a first list; selecting enough ranked storage volumes within the source storage pool, starting from the top of the list, until the remaining utilization value corresponding to not-selected ranked storage volumes within the source storage pool, within the first list, becomes smaller than the first threshold.

Theoretically adding the selected ranked storage volumes within the source storage pool, starting from the top of the first list, to a first storage pool in the target storage pool; calculating a second standard deviation corresponding to all utilization values, after the theoretical addition of the selected ranked storage volumes within the source storage pool, to the first storage pool in the target storage pool; defining a benefit value as the difference between the first standard deviation and the second standard deviation; in case the benefit value is negative, terminating the optimizing the storage area network; defining a cost value based on a size of the selected ranked storage volumes within the source storage pool, starting from the top of the first list; taking a ratio of the benefit value to the cost value; maximizing a value of the ratio by trying different storage pools in the target storage pool; selecting a storage pool in the target storage pool corresponding to a maximum value of the ratio, as a reallocation candidate; adding the reallocation candidate to a candidate reallocation plan; and optimizing the candidate reallocation plan, based on standard deviation values before and after adding the reallocation candidate to the candidate reallocation plan, and based on a comparison to a second threshold.

An embodiment of this invention is depicted in FIGS. 1-5. Referring to FIG. 1, step 110, storage pools are sorted based on the utilization and a storage pool with the highest utilization is selected (Step 112). The storage utilization for this pool is compared with a predetermined threshold (Step 114). If storage pool's utilization is not higher than this threshold (Step 116), sorted storage list is checked to see if there is another storage pool available (Step 118). If no other storage pool is available, the process ends and process is terminated. If another storage pool is available, it is selected (Step 120) and steps 114 and 116 are repeated.

Figure 2:
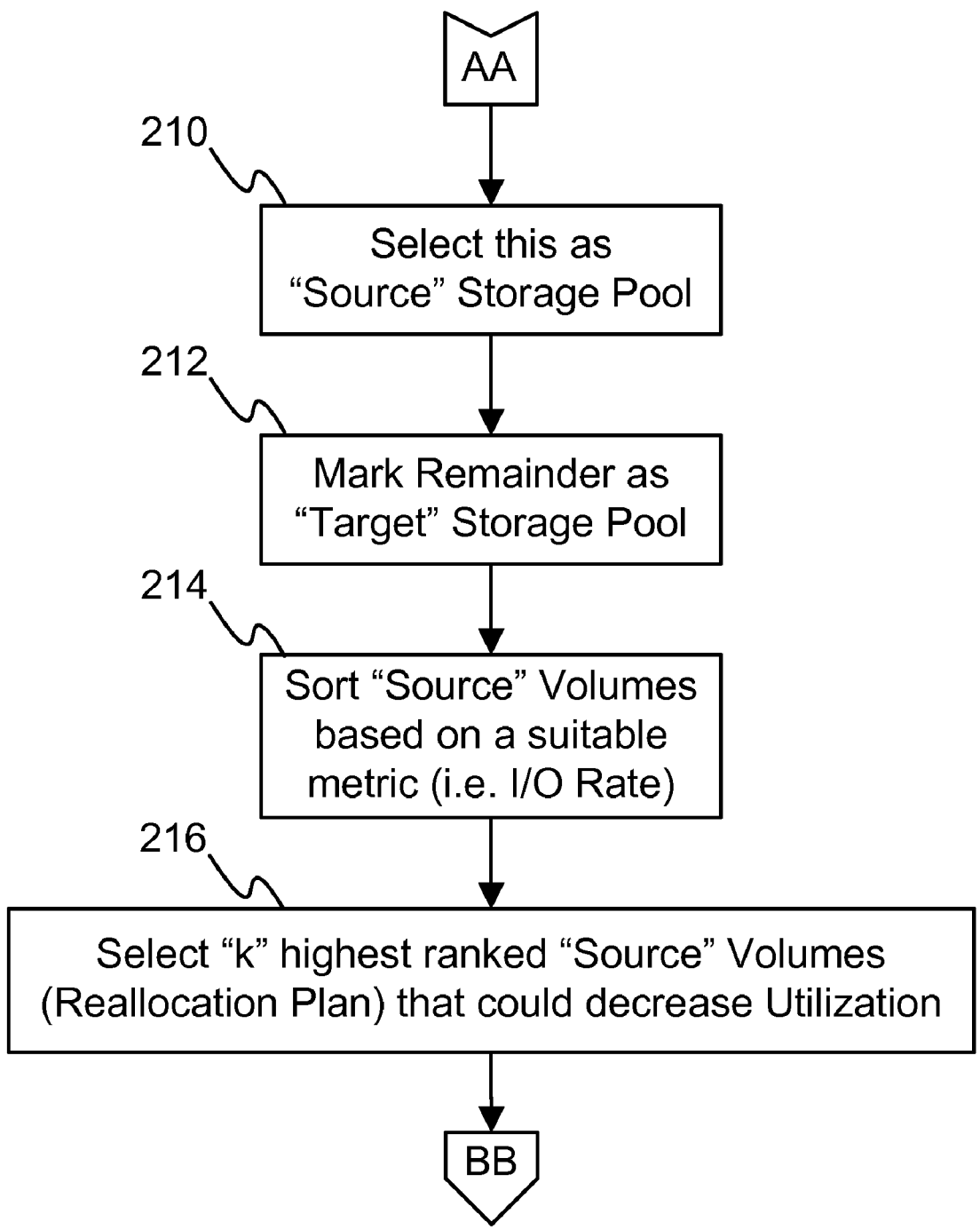
FIG. 2 is the flow diagram for selection of "Target" storage pool and reallocation plan.

If storage pool's utilization is higher than this threshold (Step 116), this storage pool is selected as "Source" storage pool (referring to FIG. 2, step 210). Once the "Source" storage pool is selected all other storage pools in the list are marked as "Target" (FIG. 2, step 212). At this stage, "Source" storage volumes are examined and sorted bases on a performance metric such as Input/Output (I/O) rate (Step 214). From this list, "k" highest ranked storage volumes which could possibly decrease the utilization are selected and marked as "reallocation plan" (Step 216).

Figure 3:
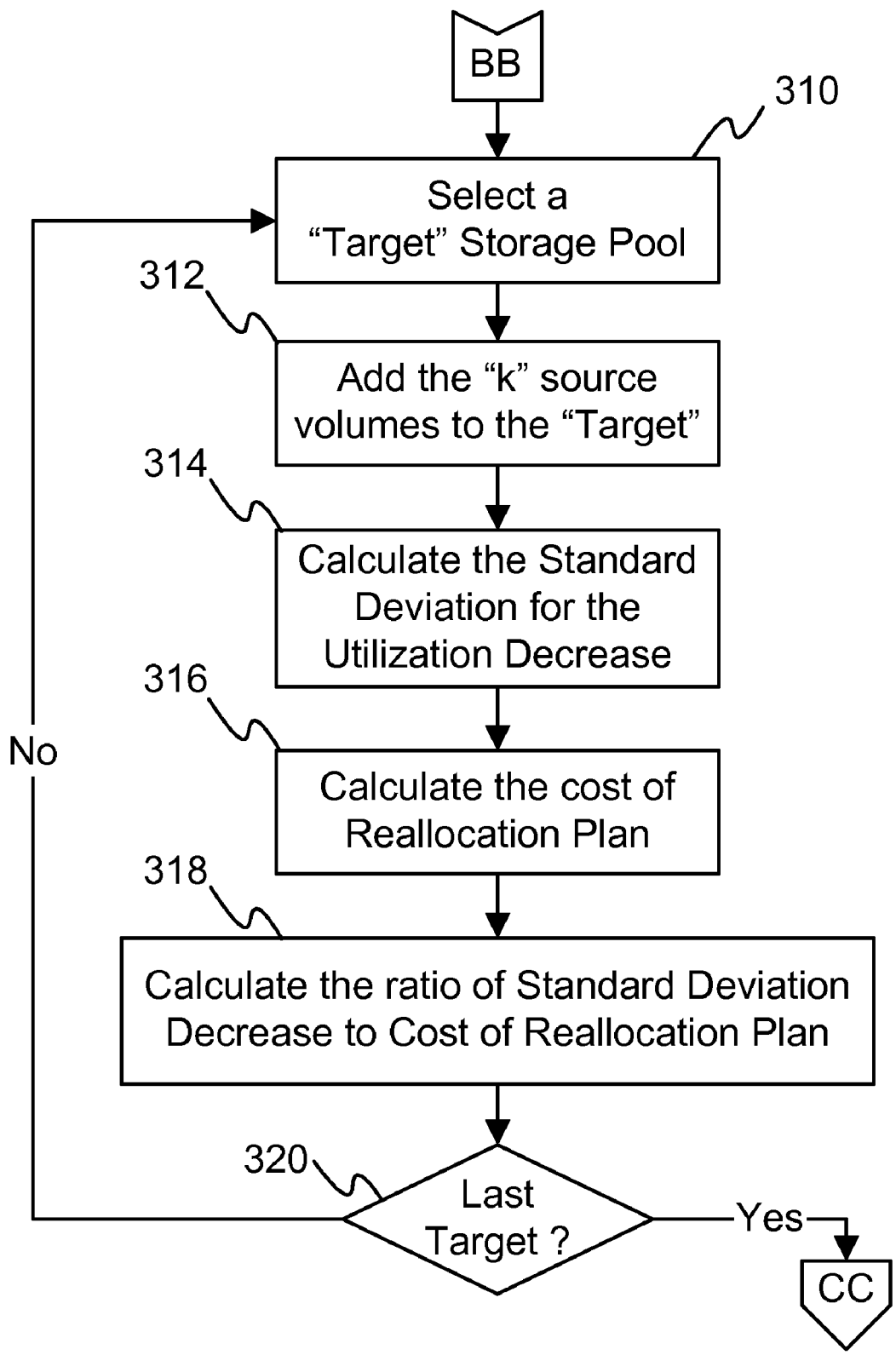
FIG. 3 is the flow diagram for calculating the effect of reallocation on the targets.

Continuing with FIG. 3, an embodiment takes the following steps: select the first target storage pool (Step 310), and add the "k" source volumes selected as "reallocation plan" to this target storage pool (Step 312). Calculate the standard deviation for the utilization decrease for this reallocation (Step 314), calculate the cost of reallocation plan implementation (Step 316), and calculate the ratio of standard deviation of utilization decrease to cost of reallocation (Step 318). Select a next target from the list of the targets if this is not the last target (Step 320), and repeat steps 310-318 until this change is determined for all the storage volume targets.

Figure 4:
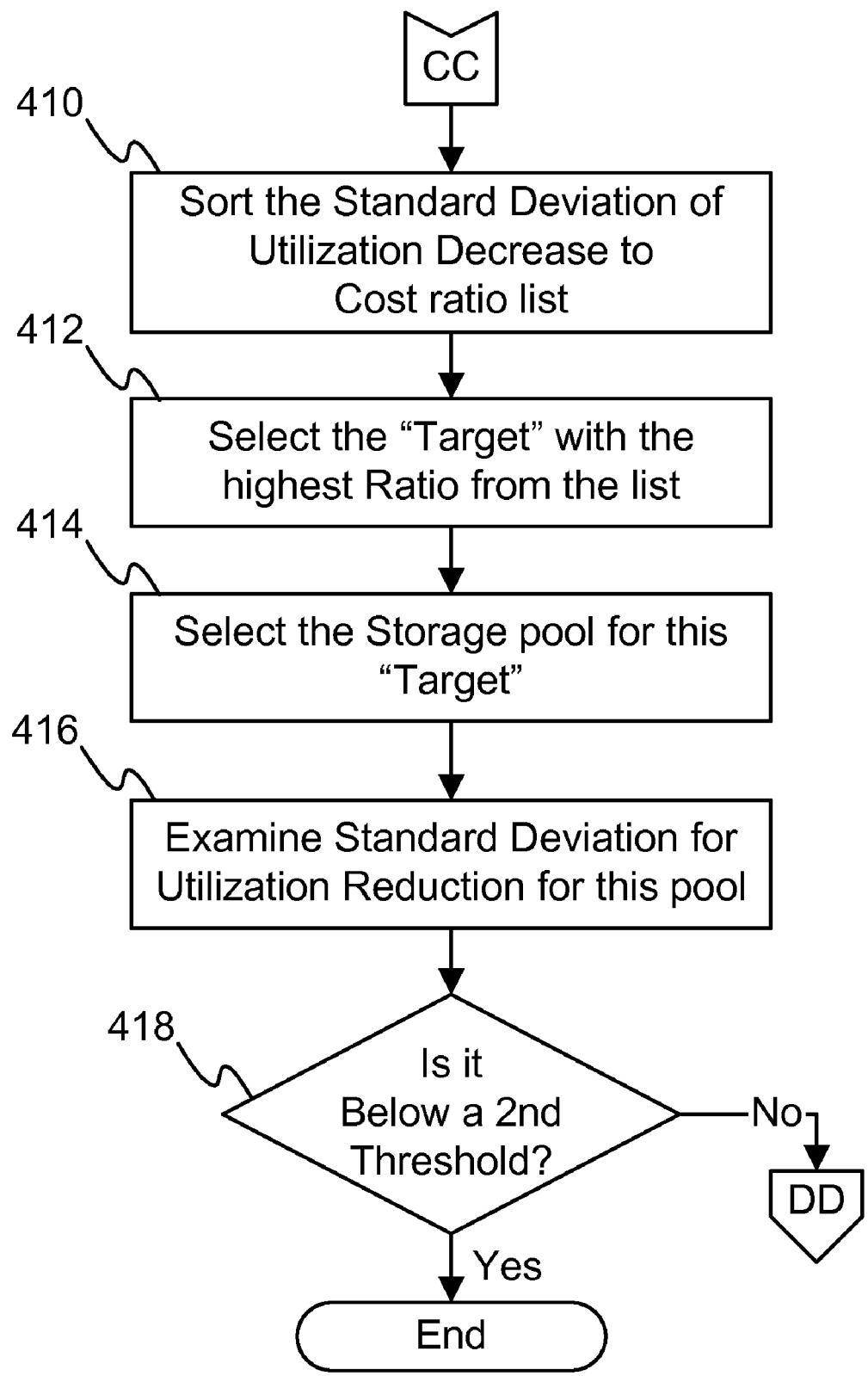
FIG. 4 is the flow diagram for selection of the target storage pool with the highest utilization to reallocation cost ratio.
Figure 5:
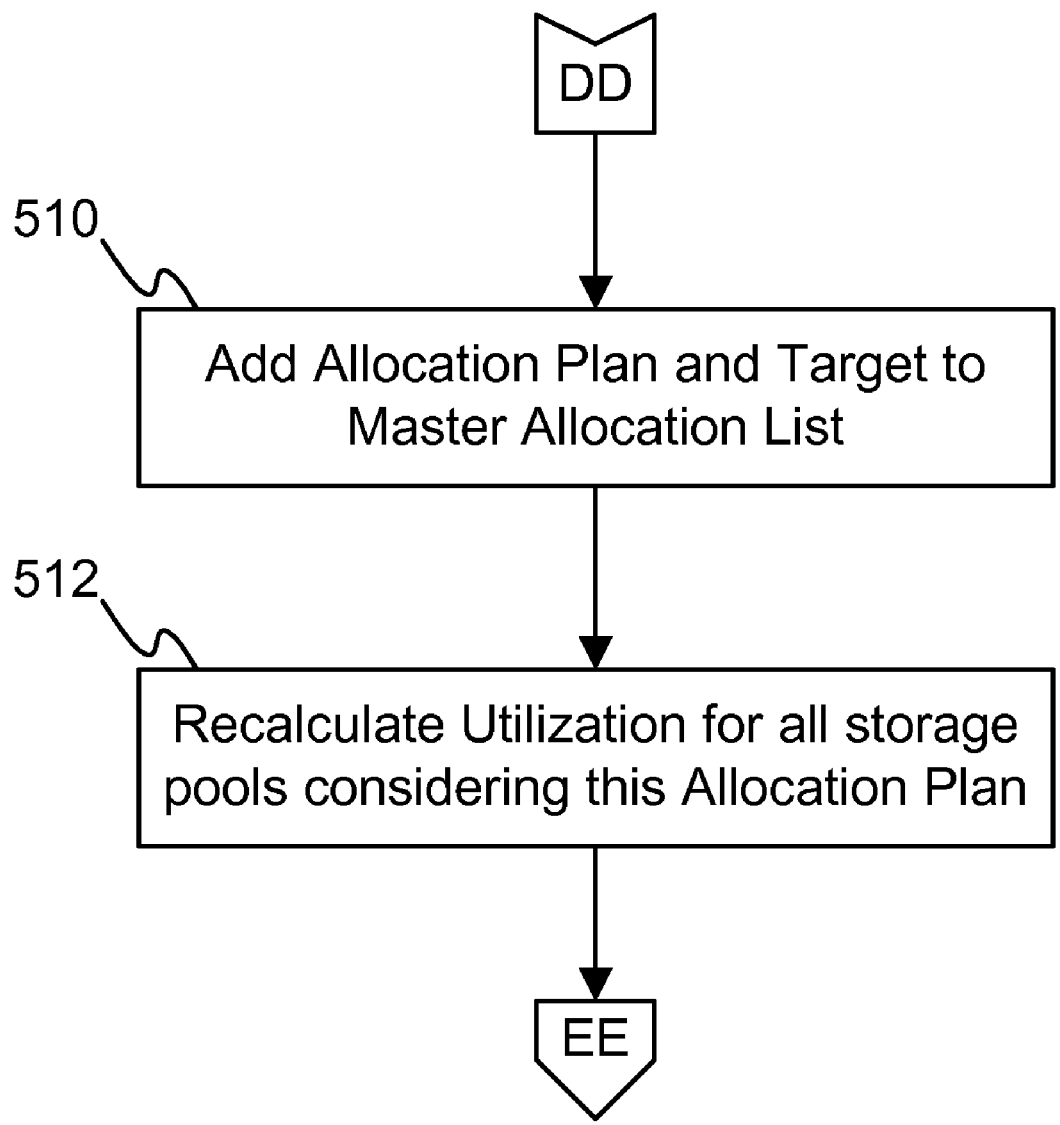
FIG. 5 is the continuation of the flow from FIG. 4.

Continuing with FIG. 4, an embodiment takes the following steps: sort the list of the targets with the ratio of standard deviation for utilization reduction to reallocation cost, based on this ratio (Step 410), select the target with the highest ratio (Step 412), select the storage pool for that target (Step 414), examine the ratio of standard deviation for utilization reduction to reallocation cost with a second predetermined threshold (Step 416). If this is below the second threshold (Step 418), utilization is in range and the process ends.

If this ratio is not below the threshold, an embodiment of the invention takes the following steps: add reallocation plan and target to master reallocation plan list (FIG. 5, step 510), recalculate utilization for all of the storage pools considering this reallocation plan (Step 512) and start the process again (e.g., from step 110 of FIG. 1). Repeat this process until the optimum utilization is found and master utilization plan list includes all the targets and associated reallocation plans to achieve the optimization goal.

A system, apparatus, or device comprising one of the following items is an example of the invention: storage area network, storage controller, storage pool, storage volume, disk, server, data path, router, network, communication media, cable, fiber optics, physical layer, buffer, node, switch, and any software module, applying the method mentioned above, for purpose of invitation or optimizing storage utilization.

Any variations of the above teaching are also intended to be covered by this patent application.

The invention claimed is:

1. A computer implemented method for optimizing a storage area network by rebalancing the utilization of internal components in said storage area network, wherein said storage area network comprising multiple storage controllers and multiple storage pools, said method comprising:

each controller among said multiple storage controllers controlling one storage pool among said multiple storage pools;

wherein each storage pool among said multiple storage pools comprising multiple storage volumes;

sorting every storage pool among said multiple storage pools, based on a corresponding utilization value;

selecting a storage pool with a highest utilization value as a source storage pool, marking all remaining storage pools except said source storage pool as target storage pools;

sorting all storage volumes within said source storage pool into a first list based on a metric, wherein said metric comprising an input-output rate;

selecting k highest ranked storage volumes within said source storage pool, wherein k is a positive integer;

marking the selected k highest ranked storage volumes as a reallocation plan;

for each target storage pool performing the steps of:
 (a) selecting a target storage pool from said target storage pools;
 (b) theoretically adding said selected k highest ranked storage volumes within said source storage pool to said selected target storage pool;
 (c) calculating a standard deviation for the utilization decrease based on the theoretical adding of the selected k highest ranked volumes to the selected target storage pool;
 (d) calculating a cost of implementing the theoretical adding of the selected k highest ranked volumes to the selected target storage pool;
 (e) calculating a ratio of said standard deviation for the utilization decrease to said cost;

sorting a second list of the calculated ratio of said standard deviation for the utilization decrease to said cost for each target storage pool;

selecting a target storage pool with a highest ratio from said second list;

examining a standard deviation for utilization reduction for the selected target storage pool with a highest ratio;

if the selected target storage pool with a highest ratio has a standard deviation for utilization reduction below a predetermined threshold value, ending the optimizing;

if the selected target storage pool with a highest ratio has a standard deviation for utilization reduction equal to or above the predetermined threshold value, adding the selected k highest ranked storage volumes and selected target storage pool to a master allocation list.

\* \* \* \* \*